United States Patent [19]

de Wit

[11] 3,982,203

[45] Sept. 21, 1976

[54] METHOD OF PREVENTING POST PULSING OF Q-SWITCHED LASER

[75] Inventor: Michiel de Wit, Dallas, Tex.

[73] Assignee: Texas Instruments Incorporated, Dallas, Tex.

[22] Filed: Dec. 28, 1973

[21] Appl. No.: 429,474

[52] U.S. Cl. .................. 331/94.5 Q; 331/94.5 T; 331/94.5 C
[51] Int. Cl.² ........................................ H01S 3/00
[58] Field of Search................. 331/94.5; 330/4.3

[56] References Cited
UNITED STATES PATENTS

| | | | |
|---|---|---|---|
| 3,464,026 | 8/1969 | Woodbury et al. | 331/94.5 C |
| 3,621,457 | 11/1971 | Cuff | 331/94.5 P |
| 3,634,779 | 1/1972 | Crow | 331/94.5 P |
| 3,790,898 | 2/1974 | Gudmundsen et al. | 331/94.5 C |

OTHER PUBLICATIONS

Laser Focus, Oct. 1971, p. 51, excerpt/abstract entitled "Acousto-Optic Q-Switch....Yog".
Morozova et al., Soviet J. of Optical Technology, 1969, pp. 689–692.
Berger et al., Annual Summary Report, AD743491, Mar. 1972, pp. 1–3, FIG. 6 & FIG. 9.

Primary Examiner—Robert J. Webster
Attorney, Agent, or Firm—Harold Levine; James T. Comfort; William E. Hiller

[57] ABSTRACT

An improved optically pumped, acousto-optically Q-switched laser is disclosed, capable of significantly increased output energy. Optical coatings, with their inherent limitations on maximum energy of the output pulse, are completely eliminated. At the reflecting surfaces, Porro prisms replace the mirrors conventionally used. At the non-reflecting or transmitting surfaces, conventional, anti-reflective coatings are eliminated by placing the respective elements at the Brewster angle for the dominant polarization of the Q-switching material. Optimum output coupling is achieved by adjustment of the Q-switch drive. In order to prevent undesired second pulses in the output, which normally limit the maximum attainable output energy, a filtering shield of material opaque to the operating frequency is placed in the laser cavity, between the flash pump and the laser rod, to minimize the possibility of a second-pulse buildup due to random emission before the Q-switch is turned fully off. The wavelength of the output radiation may be sequentially selected from among the various spectral lines of the lasing material, by appropriate selection of the RF frequency applied to the acousto-optic element.

1 Claim, 7 Drawing Figures

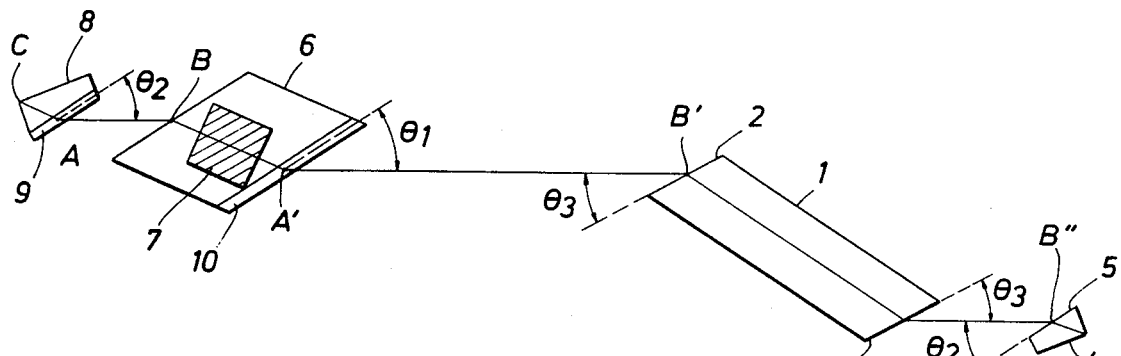
FIG. 1
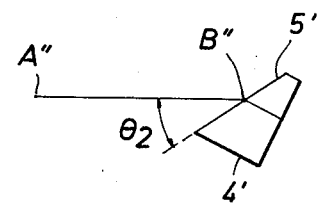
FIG. 2
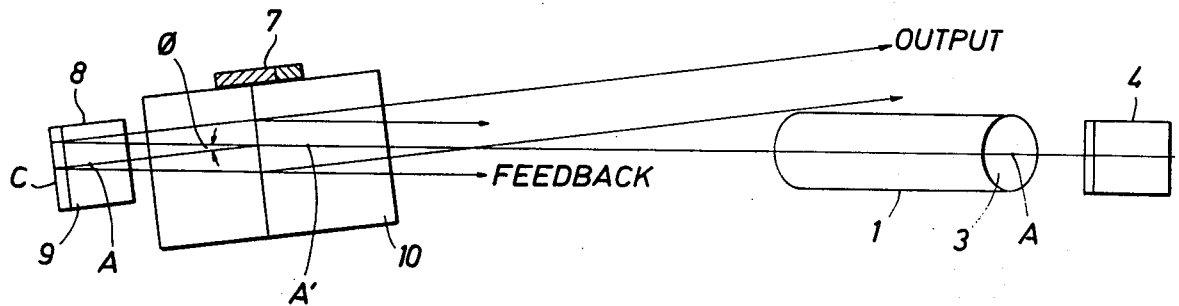
FIG. 3
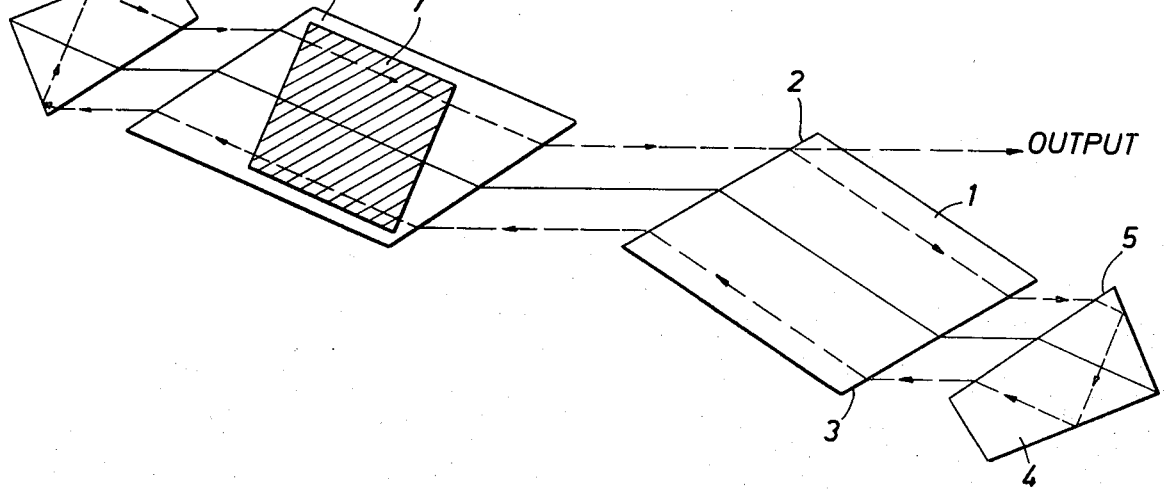

METHOD OF PREVENTING POST PULSING OF Q-SWITCHED LASER

FIELD OF THE INVENTION

This invention relates to lasers, and more particularly to acousto-oplically Q-switched lasers.

BACKGROUND OF THE INVENTION

Since the advent of the acousto-optically Q-switched laser described in the U.S. Pat. No. 3,725,812, to Warner C. Scott, efforts have been made to increase the energy of the laser output pulses, as is desirable in many laser applications.

The laser described in the above-mentioned Scott patent utilizes a highly effective Q-switching technique, permitting very large buildups of population inversion level in the lasing rod. When the switch is turned on, raising the Q of the laser cavity by deflecting radiation at the Bragg angle to a feedback mirror, lasing action occurs in the system, accompanied by a large release of laser energy. One of the limiting factors in the amount of energy that could be present in the output pulse of such lasers has been the presence of dielectric optical coatings on various elements of the system.

It should be borne in mind that we are speaking of energies of the order of magnitude of 10–100 megawatts per square centimeter. At such energy levels, the optical coatings on mirror elements tend to be destroyed. The same is true of the anti-reflective coatings commonly present on the surface of the laser rod to prevent reflections and insure that the desired light energy enters the rod to establish and sustain lasing action.

Furthermore, when the laser rod is so highly pumped, to obtain output pulse energies in this range, the population inversion level is so high that, after the desired pulse is taken out, there is sufficient residual population inversion in the rod that a random emission in the cavity, upon entering the rod in nearly the axial direction, may create an undesired second laser output pulse.

Finally, in certain laser applications such as bomb guidance, it would be desirable to have a laser functioning at selectively variable wavelengths.

Accordingly, it is a feature of the present invention to provide a laser eliminating the problems associated with previously used optical coatings without the introduction of additional optical components, such as reflectors and beam splitters.

It is a further feature of the invention to provide increased output energy, by minimizing the possibility of unintended second output pulses, which usually limit the useful single pulse output energy of these lasers.

It is still another feature of the invention to provide a selectively variable laser output wavelength.

Other features and advantages of the invention will be apparent to persons skilled in the art from consideration of this specification, including the claims and drawings.

SUMMARY OF THE INVENTION

The improved acousto-optically Q-switched laser of the present invention eliminates all optical coatings, with their inherent limitations on maximum energy of the output pulse. At the reflecting points, Porro prisms replace the mirrors conventionally used. At the non-reflecting or absorbing surfaces, conventional anti-reflective coatings are eliminated by placing the respective elements at the Brewster angle for the particular dominant polarization of the Q-switching material. No additional components need to be added to the laser resonator, such as beam splitters to provide output coupling since this is accomplished by adjustment of the Q-switch drive, or reflectors to contain radiation that would otherwise not go into output or feedback, or polarizers to provide proper Q-switch operation, since polarization is automatically accomplished by the acousto-optic Q-switch. In order to prevent undesired second pulses in the output, a filtering shield is placed in the laser cavity, between the flash pump and the laser rod, to minimize the possibility of a second-pulse buildup due to random emission before the Q-switch is turned fully off. The frequency of the output radiation may be selected from among the various spectral lines of the lasing material, by appropriate selection of the RF frequency applied to the acousto-optic element.

BRIEF DESCRIPTION OF THE DRAWINGS

FIG. 1 is a top view of a laser system in accordance with the present invention.

FIG. 2 is a side view of the laser system of FIG. 1.

FIG. 3 is an illustration of the round-trip radiation path in the system of FIGS. 1 and 2.

DETAILED DESCRIPTION

Figure 4:
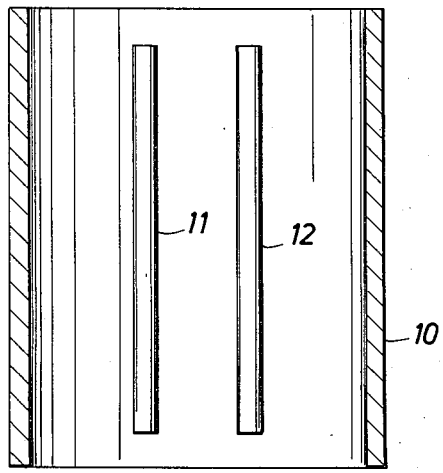
FIG. 4 is a longitudinal cross-section of a conventional laser cavity.

It has been previously known to employ Porro prisms in lasers, instead of mirrors. See e.g., U.S. Pat. No. 3,464,026 to Woodbury. It has also been known in other kinds of Q-switched lasers to mount elements at the Brewster angle, to minimize undesired reflection. Until the present invention, however, it has not been appreciated that the combining of these principles would permit elimination of optical coatings, and the consequent obtaining of controllably higher energy output pulses, without the necessity of beam-splitters, polarizers, additional reflectors and the like. This may be accomplished as follows.

Referring now to FIG. 1 of the drawings, an acousto-optically Q-switched laser is schematically shown, in plan view. The points A-B, A'-B', and A''-B'' define three parallel vertical reference planes (vertical meaning perpendicular to the plane of the drawing).

A rod 1 of lasing material, with it faces cut at Brewster's angle, is mounted horizontally at an angle $\theta_3$ to the vertical reference plane defined by a line A'-b'. The rod may be, for example, neodyminum-doped YAIG material, cylindrical in shape, having its end faces 2 and 3 lying in vertical planes, and tilted relative to the cylinder axis to satisfy Brewster's condition for the laser radiation.

Mounted at the angle $\theta_2$ to a reference vertical plane defined by the line A''-B'', is a Porro prism 4. The face 5 of Porro prism 4 also lies in a vertical plane, and is oriented at Brewster's angle.

The apex line of Porro prism 4 may be vertical, as in the configuration of FIG. 1, or the apex line may be rotated 90° as in prism 4' so that the apex will be perpendicular to the plane of the drawing. The face 5' of Porro prism 4' is cut so that it still is oriented at Brewster's angle.

An acousto-optic element 6, to which RF energy is applied by transducer 7, is mounted at angle $\theta_1$, to the reference vertical planes containing lines A-B and A'-B'. Element 6 is tilted in addition about an axis perpendicular to vertical plane A'B to orient it for Bragg-deflecion of the radiation. Element 8 is also tilted by the same amount as 6 about an axis perpendicular to vertical plane AC. The front faces 9 and 10 of elements 8 and 7 are thus visible in the view presented by FIG. 1. The Q-switch device 6 is typically made of fuzed quartz and has the property of deflecting a larger portion of the radiation polarized in the plane of FIG. 1 than of the radiation polarized in the vertical plane. The switch is constructed so that this predominantly deflected polarization is, in the embodiment here illustrated, horizontal. The radiation fed back to laser rod 1 will have been deflected by Q-switch 6. Lasing action therefore builds up in the dominantly deflected horizontal polarization and lasing action of radiation with vertical polarization is suppressed. Some radiation with vertical polarization is generated by the laser rod 1 due to thermally induced birefringence. This radiation undergoes Fresnal reflection losses at the faces of the components 8, 6, 1, and 4. These losses may be reduced by constructing element 6 and 8 as a single unit. A second Porro prism 8 is mounted with its incidence face 9 at an angle $\theta_2$ to the vertical reference plane containing line A-B. The apex is parallel to the direction of acoustic propagation, defined by the transducer 7. The angles $\theta_i$ are related to the refractive index of the components by $\cot \theta_i = n_i$.

Referring now to FIG. 2 of the drawings, the same laser arrangement as in FIG. 1 is shown, in side view. It is seen that the acousto-optic element 6 and Porro prism 8 are canted at an angle $\phi$ to the horizontal plane. The angle $\phi$ is shown exaggeratedly large, for illustrative purposes. In actuality it would be approximately the Bragg angle for the wavelengths used, perhaps on the order of ½°. The purpose of mounting near this angle is to permit Porro prism 8 to function as a feedback reflector when the acousto-optic switch 6 is turned on.

Returning to FIG. 1, Porro prisms 4 and 8 are chosen in order to replace the mirrors commonly used to effect feedback through the laser rod, and hence produce lasing action. The difficulty with mirrors for this purpose is that a very high power level, for example, 100 megawatts per square centimeter, the optical coatings on the mirrors tend to become damaged, thus making lasing action impossible. Porro prisms have no optical coatings, and hence eliminate this problem. While Porro prisms are given as an example here, it should be understood that other retro-reflectors may be employed, the only restriction being that the retro-reflector elements not change the polarization of the reflected light.

Replacing mirrors with retro-reflectors would not alone accomplish the objective of permitting higher power levels, since if any surface in the feedback path becomes burned or defective, lasing action will be impaired. Accordingly, the anti-reflective coatings commonly placed on the non-reflecting surfaces, such as on end faces 2 and 3 of the lasing rod 1, must be likewise eliminated. This is accomplished, in accordance with the present invention, by cutting these faces at the appropriate angle to obtain Brewster's condition.

The Brewster angle is defined as the angle of incidence for which a wave polarized parallel to the plane of incidence is wholly transmitted with no reflection. The plane of incidence is the plane defined by the line representing the direction of an incident ray and the line representing the direction of reflection, if the wave were reflected.

Referring now to FIG. 1, the plane of incidence will be a horizontal plane, because all the incidence faces are vertical planes. Therefore, if a horizontally polarized beam of light is emitted from face 2 of the laser rod 1, toward the acousto-optic element 6, there will be an angle at which all of the beam will be transmitted into the acousto-optic element 6. This angle is the Brewster angle, the computation of which is well-known in the art. Mounting elements at the Brewster angle in order to prevent reflection has been done before, for example, in gas lasers, wherein the ends of the laser cavity are angulated, and called "Brewster windows," but not for the purposes herein stated.

Referring now again to FIG. 2 of the drawings, it has been determined that tilting the acousto-optic element 6 and the Porro prism 8 at a slight angle $\phi$ does not significantly impair the anti-reflective properties of the system, although it should be recognized that the plane of incidence is not exactly parallel to the plane of polarization of the beam. This angle permits Bragg deflection by the acousto-optic switch 6.

Referring now to FIG. 3 of the drawings, a round trip raypath is illustrated. The photon emerges from face 2 of the laser rod 1, moves through the acousto-optic element 6 where part is deflected downward. Both parts travel to the Porro prism 8. Porro prisms as viewed in FIG. 3 have the characteristic of reflecting light back along a line parallel to the direction of incidence, and opposite in sence. The light accordingly passes back through the acousto-optic element 6 where part of it is deflected again. The deflections in the Q-switch split the beam into 4 parts two of which reenter laser rod 1, where stimulated emission, or lasing action, occurs. The multiplied photons then pass out of the laser rod 1 at the Brewster angle, and move to Porro prism 4, and thence back to end face 3 of the laser rod 1. The other two parts pass from the Q-switch 6 over the laser rod 1 and are the laser output.

It will be understood, of course, that the foregoing lasing action will occur only when the acousto-optic switch 6 is turned "on" by application of RF energy through transducer 7, as described in the above-mentioned patent to Scott.

With the arrangement above describe, it is seen that all optical coatings in the system have been eliminated, thereby permitting greater energy pulses to be produced through the system, without damage. The output pulse energy is, moreover, controllable, through the amount and risetime of RF energy pulse applied to the acousto-optic element 6. The maximum beam diameter is generally determined by the laser rod diameter. The ratio of the beam diameter in the Q-switch 6 to laser rod 1 is equal to the ratio of the refractive indices $n$(Q-switch) / $n$(laser rod), which is 1.5/1.8 for a fuzed quartz Q-switch and a YAlG:Nd laser rod. The diameter of the transducer 7 can therefore be reduced so that less RF drive is necessary to obtain lasing action with a Brewster faced system than with a standard perpendicular faced in line system.

Figure 5:
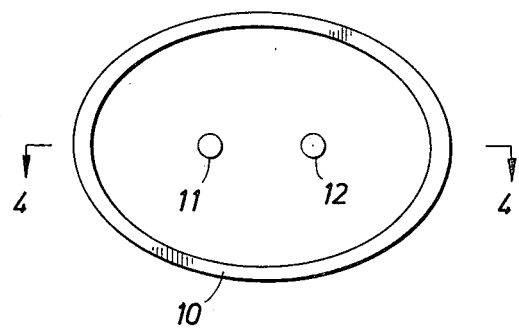
FIG. 5 is a transverse cross-section of a conventional laser cavity.

The next aspect of the invention will be described with reference to FIGS. 4 and 5 of the drawings. The laser cavity has an internally reflecting elliptical wall 10 surrounding a laser rod 11 and a flashlamp 12 for exciting the atoms of the laser rod 11 to higher energy levels. This is the conventional layout, with the rod 11 and the flashlamp 12 each being located at a focus of the ellipse, the purpose being to assure that nearly all the light emanating from the flashlamp 12 will be reflected to the laser rod 11.

The problem encountered is the phenomenon of "second pulsing," or "post pulsing." Although only a single output pulse is desired, there is, without the present invention, sufficient residual radiation in the cavity at the lasing wavelength, e.g., 1.06 microns, to cause a second output pulse at high excitation levels. This happens because the desired Q-switched pulse is generated during the turning-on period of the Q-switch. After this pulse has evolved the Q-switch continues to turn-on, and provides successively higher amounts of feedback to the laser rod. During this period some random emissions occur around the cavity, of photons at the lasing wavelength. Some of these photons will re-enter the laser rod. Due to the roughness of the rod surface, these photons might be deflected from the rod surface into the interior of the rod, in directions near enough to the axial direction to be amplified by the laser and thus cause a second pulse. The phenomenon is not encountered in systems having faster switches, e.g., electro-optic elements. In these systems the residual radiation causes a depletion of the population inversion level, so called "transverse depumping" and thus limit the maximum extractable energy from the laser.

The present invention minimizes this effect, by eliminating many of the intra-cavity reflection paths which contribute to second-pulse buildup.

Figure 6:
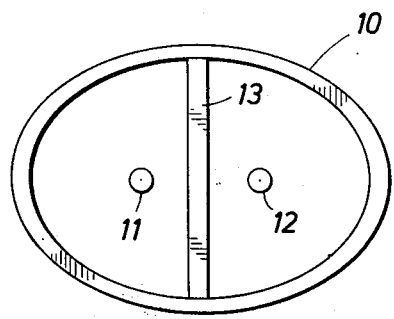
FIG. 6 is a transverse cross-section of a laser cavity according to the present invention.

Much of the spontaneously emitted energy passes through the center area of the cavity 10 in the process of being reflected back into the laser rod 11. To prevent the undesired second-pulse emission described above, a filtering material is inserted in the cavity, between laser rod 11 and flashlamp 12. The material is relatively opaque to radiation at the lasing wavelength, but relatively transparent to the pumping radiation. This filtering material may take any of several forms, including a filtering dye in the coolant water of the cavity. It is preferred, however, to insert a wall of filtering glass 13 between the laser rod 11 and the flashlamp 12, as shown in FIG. 6 of the drawings. If the laser radiation wavelength is, for example, 1.06 microns, a 4 mm-thick samarium-doped glass may be used, which is opaque at 1.06 microns (the operating wavelength) but transparent to the pump light wavelength, e.g., 0.8 microns.

There is a point where "dynamic equilibrium" is reached. Beyond this energy level, multiple output pulses will be obtained, even with the filter in place. What the filter does is permit an increased input energy to the flashlamp, before uncontrolled multiple-pulse output will occur. For example, in an experimental device in which the above mentioned limit was 220 millijoules per output pulse, with a 19 joule input pulse, addition of the filter raised the permissible input energy to 36 joules, with a 360 millijoule single-pulse output, an increase of 60% over the no-filter operation.

It has been previously known to use filtering materials in laser cavities, but not in acousto-optically Q-switched lasers. See, e.g., T. G. Crow, in Laser Journal, Nov./Dec., 1970, p. 18. The purpose there, however, has been to prevent the spontaneously emitted 1.06 microns radiation from being reflected back into the rod, hence depleting the population inversion and thus leading to saturation of the output of the laser. Such a conditon is known as "transverse depumping" or "super-radiance," or reaching the "super-radiant limit." This has not been a problem in the acousto-optic Q-switched laser.

In the acousto-optic Q-switched laser, it has been found that, for a given input energy, the same output energy is obtained with or without the filter 12. It is the double-pulse threshold which is increased in the present invention.

In order to assure the above-described enhancement of the multiplepulse limit, the surfaces of laser rod 11 should have as little reflectivity as possible. This prevents the formation of a double pulse by "trapping" of 1.06 microns energy within the rod 11.

Figure 7:
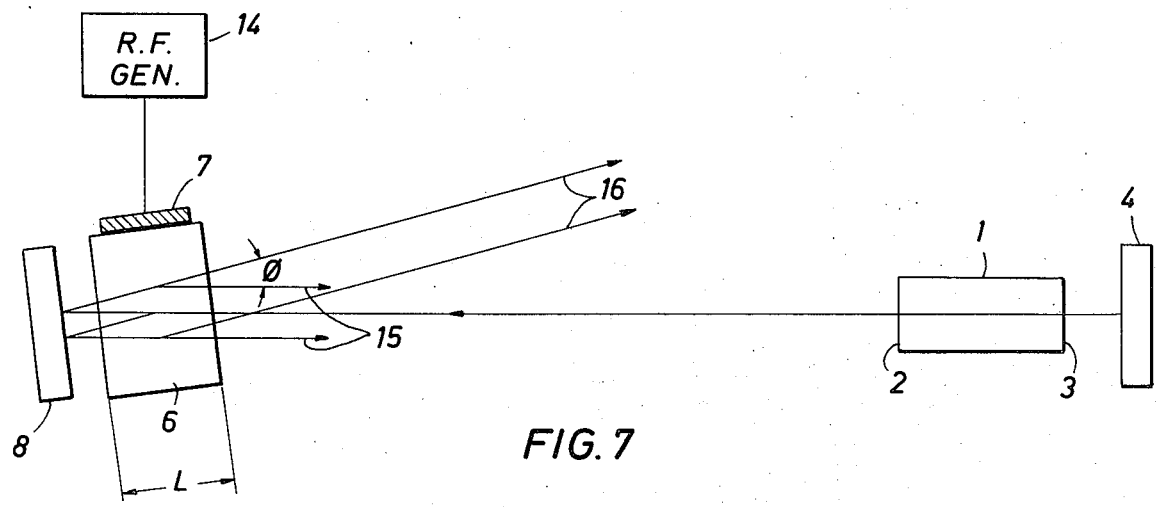
FIG. 7 is an illustration of a laser system which is wavelengthagile, in accordance with the present invention.

Referring now to FIG. 7 of the drawings, another aspect of the invention is shown. Here the laser arrangement is depicted with flat high reflectivity mirrors, but it will be understood that the advantages of this aspect of the invention can also be obtained with Porro prisms being used, in place of the mirrors 4 and 8, provided their apex lines lie in the plane of FIG. 7. It will further be understood that any of the various geometries disclosed in the above-mentioned patent to Scott may be advantageously employed with this aspect of the invention.

As discussed above, the angle $\phi$ is the angle at which a portion of the radiation from the laser rod 1 is deflected by the acousto-optic element 6, to which RF energy is applied through transducer 7. It is known that the angle $\phi$ is a function of the wavelength of the emitted radiation from laser rod 1, and of the wavelength of the acoustic energy delivered to the acousto-optic element 6 by RF generator 14 via transducer 7. For practical purposes, the angle $\phi$ (in radians) is approximately equal to the ratio of the wavelength of the laser light $\lambda$ in vacuum to the wavelength of the acoustic energy $\Lambda$. The angle $\phi$ being fixed by the geometry of the cavity, the laser output wavelength can now be selected from among the various spectral lines characteristic of the particular laser material employed in laser rod 1. The selectivity is obtained by selecting the appropriate RF frequency and thereby the acoustic wavelength, which when multiplied by the angle $\phi$ (fixed as a constant by the geometry) determines the wavelength of laser light which will be fed back by means of the mirror or Porro prism 8. There are two requirements for lasing action at this new wavelength—first, that there is sufficient gain for the laser rod 1 at this new wavelength so that the feedback from mirror 8 can maintain laser action; and secondly, the deflection element 6 must provide sufficient selectivity so that nearby wavelengths, for which rod 1 also has high gain, are not sufficiently deflected along direction 15 to cause laser action. The RF generator 14 can be programmed to switch from one frequency to another sequentially, at selectable time intervals, thereby permitting the laser output wavelenght to be arbitrarily switched among the various spectral lines of the lasing material, without the need of mechanical readjustment of the laser resonator components. Simultaneously with the change in frequency the amplitude of the Rf pulse may be changed to control the output energy 16 of the laser pulse.

Such a "wavelength-agile" laser is especially desirable for such applications as target locaters, since it would be very difficult to jam the laser at all and these possible wavelengths.

A suitable RF generator 14 may be selected from among commercially avialable items. The requirements are that it have a bandwidth of 50–150 megahertz, and an an output power of up to 50 watts.

It is apparent that the angular resolution of the acousto-optic deflector must be high enough to discriminate among the various wavelengths of the various laser spectral lines. Referring again to FIG. 7 of the drawings, the resolution of the acousto-optic deflector 6 is defined in terms of the angular range over which the condition $$\phi = \lambda/\Lambda$$

is still sufficiently well satisfied to give more than half the maximum attainable deflection. This range is $$\Delta \phi \cong \Lambda/L$$

where L is the length of the acoustic transducer. Typical values are $f_{acoustic} = 10^8$ Hz; $\Lambda = 66\times10^{-3}$ cm.; L = 4 cm., so that for $\lambda = 1.06$ microns, $\phi$ will be 0.016 radians and $\Delta \phi / \phi = 0.1$, hence the fractional shift in wavelength $\Delta\lambda/\lambda$ must be larger than 0.1. Such a pair of wavelengths is available in YAIG:Nd at 1.064 microns and 1.319 microns with $\Delta\lambda/\lambda \cong 0.2$.

Wavelength agility is attainable among the three groups of lines characteristic of the YAIG:Nd laser material at room temperature. The bandwidth of the acoustic transducer 7 and RF generator 14 for this purpose should be about 30%. "Bandwidth" in this sense means the ability to vary the RF frequency while at the same time maintaining the acoustic energy coupled into deflector 6 approximately constant. This may be achieved by construction methods of transducer 7 which are well-known to those versed in the art, automatic adjustment of the output energy of generator 14, special design of the electrical coupling network between generator 14 and transducer 7 or any combination of these techniques.

It should be understood that when reference is made herein to "a spectral line" or "a transition line," the terms are intended to include a closely spaced group of lines. Thus, switching from one group of lines, some or all of which may be within the resolution of the reflectors, to another group of lines, would be included within the present invention.

What is claimed is:

1. A method of preventing post pulsing of an acousto-optically Q-switched laser system comprising a laser cavity which includes therein a laser rod, first reflecting means mounted along the optical axis of said rod, feedback reflecting means mounted on the opposite side of said rod from said first reflecting means at an angle to said axis, optical pumping means for exciting the laser rod, and an acousto-optic Q-switch mounted on the optical axis of the laser rod between the laser rod and the feedback reflecting means and energizable for deflecting radiation from said laser rod to said feedback reflecting means to provide lasing action as a Q-switched pulse of lasing energy, said method comprising:

placing a filtering material within the laser cavity between said laser rod and said optical pumping means wherein the filtering material is substantially transparent to pumping radiation and substantially opaque to radiation at the lasing wavelength, and preventing residual radiation emitted in random directions from the laser rod at the lasing wavelength from being deflected into the rod into directions near enough to the axial direction to be regeneratively amplified, by absorption of said radiation in the filtering material during periods when the acousto-optic Q-switch is energized and following the generation of the Q-switched pulse of lasing energy.

* * * * *